INVENTORS
SIEGHARD WEISSFLOG
KARL-HEINZ MÜLLER

United States Patent Office 3,440,929
Patented Apr. 29, 1969

---

3,440,929
ROTARY PISTON TYPE OF COMBUSTION ENGINE
Sieghard Weissflog, Lugau, Erzgebirge, and Karl-Heinz Müller, Lichtentanne, Saxony, Germany, assignors to VEB Sachsenring Automobilwerke Zwickau, Zwickau, Germany
Filed Nov. 10, 1966, Ser. No. 593,428
Int. Cl. F01c 1/00; F16j 1/24; F02b 55/02
U.S. Cl. 91—130   5 Claims

ABSTRACT OF THE DISCLOSURE

A roatary piston type of internal combustion engine. The rotary piston has along its central axis a bore through which the latter axis passes. The piston has an inner surface which defines the latter bore thereof and which surrounds the latter axis. At least one element, such as a cylindrical slide bearing, is situated in the bore of the piston and has an outer surface directed toward and located closely adacent to the inner surface of the piston. A layer of heat-insulating material is situated between and engages the outer surface of the latter element and the inner surface of the piston, this heat-insulating layer being preferably aluminum oxide compound which has properties resulting from plasma spraying thereof.

---

Figure 1:
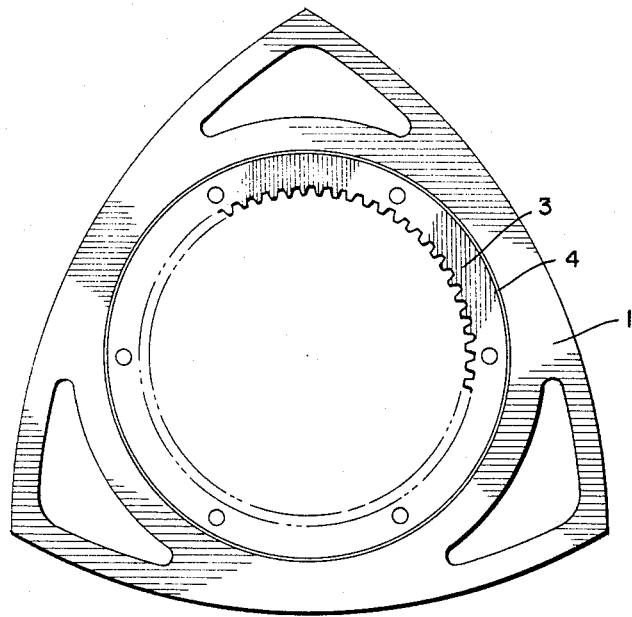

The present invention relates to a rotary piston type of internal combustion engine.

In particular, the present invention relates to a piston assembly for such an engine as well as to a method of manufacturing part of such a piston assembly.

The rotary piston is mounted, for example, on an eccentric portion of a crank shaft and is situated within an engine housing which has the configuration of a trochoid.

In the development of rotary piston types of internal combustion engines having an outer housing of trochoid configuration, oil-cooling of the piston has been eliminated and the piston remains uncooled and is lubricated, for example, by the fuel-air mixture which is applied to the roller bearing for the pistons so as to lubricate the latter bearing. In this way the expensive oil-cooling structure has been eliminated. However, experience has shown that the use of the fuel-air mixture for lubricating purposes results in thermal stresses which so greatly reduce the operating life of the poston bearing that it is this factor which determines the life of the entire engine.

Furthermore, by conveying the heat away through the rotary piston and its bearing as well as through the inner surface of the engine housing which is slidably engaged by the piston and which has the configuration of a trochoid there is the disadvantage that the combustion temperature at that part of the elongated rotary combustion chamber which forms the trailing end thereof is too low and provides a negative influence on the combustion.

Attempts have been made to increase the temperature in the combustion chamber by spraying a heat insulating layer, such as a layer of ceramic material, on the surface of the rotary piston which defines part of the combustion chamber, but unsatisfactory results have been achieved in this way since the radiation of the heat through the trochoid casing remains and there is no maintenance of a reservoir of heat.

It is known in the case of reciprocating pistons, which have combustion chambers built into same, to proide at the exterior surface of the piston which is exposed to the combustion gases a heat insulating layer so as to protect the annular part of the piston from overheating.

It is a primary object of the present invention to eliminate the above difficulties encountered in the case of rotary pistons.

Thus, it is an object of the invention to reduce the thermal stressing of the bearing for a rotary piston, so as to increase its operating life, and thus provide an engine where the operating life of the entire engine is not determined by the life of the piston bearing.

In addition, it is an object of the present invention to provide a construction which will retain the heat so as to provide a heat-storing structure which will elevate the operating temperature in the combustion chamber of the rotary piston engine so as to provide a more favorable combustion.

In addition, the object of the present invention include a method for manufacturing the structure of the invention in a manner which greatly enhances the qualities of the resulting structure.

In accordance with the present invention, the rotary piston of the engine has an axis and is formed with a bore through which this axis passes, the piston having an inner surface surrounding its axis, and at least one element is situated within the bore of the piston, this element being, for example, a piston bearing, and the element within the bore of the piston has an outer surface which is directed toward and is situated adjacent to the inner surface of the piston. A layer of heat insulating material is situated between and engages these surfaces of the piston and element in the bore thereof. In addition to a bearing, it is possible to situate within the bore of the piston an element such as a ring gear having internal teeth, and the exterior surface of this ring gear also is separated from the inner surface of the piston by the heat insulating layer. This heat insulating layer is preferably made of a compound of aluminum oxide and in accordance with the method of the invention this layer is sprayed onto at least one of the surfaces by means of a plasma spray device.

As a result of the above features, it is possible to provide for the rotary piston engine a rotary piston which is not cooled but wherein the thermal stressing of the piston bearing, whether a slide bearing or a roller bearing, is so greatly reduced that the life of the bearing is greatly increased so that the life of the entire engine is no longer determined by the life of this bearing. Moreover, as the result of the above features, the heat of the piston is carried away to such a small extent through the bearing and/or any other elements situated within the piston bore, that the piston is heated up by the combustion and heats the fuel-air mixture drawn into the combustion chamber so that the temperature level of the combustion, particularly at the trailing part of the combustion chamber, is elevated so as to provide a better combustion than could be achieved heretofore.

It is of advantage to apply the heat insulating layer at the exterior surface of the piston bearing and at the exterior surface of any other element situated in the piston bore, such as an internal ring gear or an oil supply disc threaded into the piston bore, by means of a plasma spray device.

Figure 2:
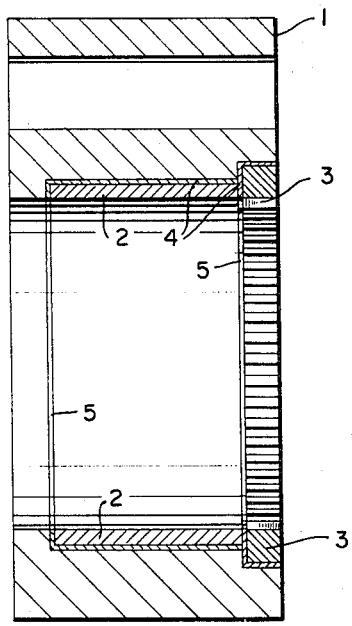

The invention is illustrated by way of example in the accompanying drawings which form part of this application and in which:

FIG. 1 shows a piston according to the present invention in a front elevation; and FIG. 2 is a transverse section of the piston of FIG. 1, the section of FIG. 2 being taken in a vertical plane, as viewed in FIG. 1, which contains the axis of the piston.

Referring to the drawings, there is shown therein a rotary piston 1 adapted to form part of a rotary piston engine of the type referred to above. This piston 1 is formed with a bore through which the axis of the piston passes, and this bore is defined by an inner surface of the piston which surrounds the axis thereof. Situated in the interior of the piston bore is a piston bearing 2 which is carried by an unillustrated eccentric portion of a crank shaft, and there is also situated in the piston bore an internal ring gear 3 which controls the piston in a well known manner. These elements 2 and 3 have outer surfaces directed toward the inner surface of the piston which defines the central bore thereof, and in accordance with the present invention a heat insulating layer 4 is situated at these surfaces. Thus, the bearing 2 has an outer cylindrical surface to which the heat insulating layer 4 is applied, and the ring 3 also has an outer cylindrical surface to which the heat insulating layer 4 is applied, these outer cylindrical surfaces of the elements 2 and 3 being complementary with adjoining inner cylindrical surfaces of the piston which surround the axis thereof.

In addition, there are flat annular surfaces situated at the ends of the bearing 2 and at the left end of the ring gear 3, as viewed in FIG. 2, and these flat annular surfaces are respectively situated in planes which are normal to the piston axis. At these flat annular surfaces a heat insulating layer 5 is located, with the layer 5 forming a continuation of the layer 4.

As has been indicated above, the heat insulating layer is preferably a compound of aluminum oxide, and in accordance with the method of the invention this heat insulating material is preferably applied by a plasma spray device. The heat insulating layers 4 and 5 can be applied, for example, to the exterior surfaces of the bearing 2 and the ring gear 3, so that the layers 4 and 5 will occupy the locations shown in FIG. 2 when the parts are assembled.

What is claimed is:

1. In a rotary piston type of internal combustion engine, a rotary piston having a central axis and formed with a bore through which said axis passes, said piston having an inner surface defining said bore thereof and surrounding said axis, at least one bearing element situated in said bore of said piston and having an outer surface directed toward and located closely adjacent to said inner surface of said piston, and a layer of heat-insulating material situated between and engaging said outer surface of said element and said inner surface of said piston.

2. The combination of claim 1 and wherein said inner surface of said piston and said outer surface of said element respectively have complementary cylindrical surface portions surrounding said axis and flat surface portions also surrounding the said axis, having an annular configuration, and situated respectively in planes which are normal to said piston axis, and said layer of heat-insulating material being situated at all of said surfaces.

3. The combination of claim 2 and wherein said element is a cylindrical slide bearing.

4. The combination of claim 3 and wherein, in addition to said slide bearing, an internal ring gear is situated in said bore of said piston and also has an outer surface directed toward said inner surface of said piston, said layer of heat-insulating material being situated between and engaging said outer surface of said ring gear and said inner surface of said piston.

5. The combination of claim 1 and wherein said heat-insulating layer is made of an aluminum oxide compound.

References Cited
UNITED STATES PATENTS

| | | | |
|---|---|---|---|
| 2,648,573 | 8/1953 | Wheildon | 308—237 X |
| 3,048,061 | 8/1962 | Mele | 308—237 X |
| 3,098,605 | 7/1963 | Bentele et al. | 230—145 X |
| 3,111,261 | 11/1963 | Bentele et al. | 123—8 X |
| 3,128,710 | 4/1964 | Blomgren et al. | 103—126 X |
| 3,170,735 | 2/1965 | Coffin | 308—4 |
| 3,307,453 | 3/1967 | Nilsson et al. | 91—84 |
| 3,359,956 | 12/1967 | Bentele | 123—8 |

CARROLL B. DORITY, *Primary Examiner.*

U.S. Cl. X.R.

92—176; 117—104; 123—8; 308—237